US012659026B2

(12) United States Patent
Kassas et al.

(10) Patent No.: US 12,659,026 B2
(45) Date of Patent: Jun. 16, 2026

(54) SYSTEMS AND METHODS FOR ACQUISITION AND TRACKING OF UNKNOWN LEO SATELLITE SIGNALS

(71) Applicant: The Regents of the University of California, Oakland, CA (US)

(72) Inventors: Zak Kassas, Columbus, OH (US); Mohammad Neinavaie, Irvine, CA (US); Joe Khalife, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 275 days.

(21) Appl. No.: 18/570,319

(22) PCT Filed: Jun. 15, 2022

(86) PCT No.: PCT/US2022/033599
§ 371 (c)(1),
(2) Date: Dec. 14, 2023

(87) PCT Pub. No.: WO2022/266204
PCT Pub. Date: Dec. 22, 2022

(65) Prior Publication Data
US 2024/0291558 A1 Aug. 29, 2024

Related U.S. Application Data

(60) Provisional application No. 63/210,595, filed on Jun. 15, 2021.

(51) Int. Cl.
*H04B 7/185* (2006.01)
*H04B 7/195* (2006.01)

(52) U.S. Cl.
CPC ....... *H04B 7/1855* (2013.01); *H04B 7/18589* (2013.01); *H04B 7/195* (2013.01)

(58) Field of Classification Search
CPC ... H04B 7/195; H04B 7/1855; H04B 7/18589
See application file for complete search history.

(56) References Cited

U.S. PATENT DOCUMENTS

| | | | |
|---|---|---|---|
| 2011/0238307 A1* | 9/2011 | Psiaki | G01S 19/31 |
| | | | 701/469 |
| 2011/0238308 A1* | 9/2011 | Miller | G01S 19/215 |
| | | | 701/472 |

(Continued)

FOREIGN PATENT DOCUMENTS

WO WO-2020/214680 10/2020

OTHER PUBLICATIONS

International Search Report dated Sep. 23, 2022 in International Application No. PCT/US22/33599.

(Continued)

*Primary Examiner* — Kenny S Lin
(74) *Attorney, Agent, or Firm* — Conley Rose, P.C.; John P. Teresinski

(57) ABSTRACT

Processes and device configurations are provided for extracting navigation observables and navigation using low earth orbit (LEO) signals. Methods and systems described herein can detect one or more low earth orbit (LEO) satellite downlink signals, and determine carrier phase observables and Doppler observables from the downlink signals in order to determine position estimates. Processes can include determining at least one carrier phase observable from the one or more LEO satellite downlink signals, wherein determining the at least at least one carrier phase observable includes tracking a modified beat carrier phase of a sample of a detected LEO signal by performing an estimation operation for a time period and adaptive updating of measurement noise. Processes can include use of position estimates for navigation and navigation based on carrier phase tracking.

(Continued)

200

205 Detect at least one Satellite Downlink Signal

210 Extract Carrier Phase Observable

215 Extract Doppler Observable

220 Determine Navigation Observable (e.g. Pseudorange Observable)

225 Control Vehicle

Processes are also provided for determination of satellite synchronization signals (SS) from downlink transmissions using subspace detection.

20 Claims, 9 Drawing Sheets

(56)                    References Cited

U.S. PATENT DOCUMENTS

| | | | |
|---|---|---|---|
| 2012/0046863 A1 | 2/2012 | Hope et al. | |
| 2014/0354477 A1* | 12/2014 | Robinson | B64G 1/36 |
| | | | 342/357.78 |
| 2015/0042511 A1* | 2/2015 | Miller | G01S 19/29 |
| | | | 342/357.51 |
| 2016/0327686 A1* | 11/2016 | Martin-Neira | G01W 1/00 |
| 2022/0171013 A1* | 6/2022 | Kassas | G01S 5/0246 |
| 2022/0171077 A1* | 6/2022 | Kassas | G01S 19/49 |

OTHER PUBLICATIONS

Written Opinion dated Sep. 23, 2022 in International Application No. PCT/US22/33599.
Khalife, et al "The First Carrier Phase Tracking and Positioning Results with Starlink LEO Satellite Signals", Aug. 15, 2022, pp. 1-4.
Malys, et al, "Geodetic Point Positioning with GPS carrier beat Phase Data from the Casa Uno Experiment", Apr. 1990, pp. 651-654, vol. 17, No. 5, Geophysical Research Letters.

* cited by examiner

SYSTEMS AND METHODS FOR ACQUISITION AND TRACKING OF UNKNOWN LEO SATELLITE SIGNALS

CROSS REFERENCE TO RELATED APPLICATION

This application is the National Stage entry under 35 U.S.C. § 371 of International Application No. PCT/US22/33599, filed Jun. 15, 2022, which claims priority to This application claims priority to U.S. provisional application No. 63/210,595 titled SYSTEMS AND METHODS FOR ACQUISITION AND TRACKING OF UNKNOWN LEO SATELLITE SIGNALS filed on Jun. 15, 2021, the content of which is expressly incorporated by reference in its entirety.

STATEMENT OF GOVERNMENT SUPPORT

This invention was made with Government support under Grant No. N00014-19-1-2511 awarded by the Office of Naval Research, Grant No. 1929965 awarded by the National Science Foundation, and Grant No. 69A3552047138 awarded by the Department of Transportation (USDOT) under the University Transportation Center (UTC) Program. The Government has certain rights in the invention.

FIELD

The present disclosure generally relates to opportunistic navigation including processes and configurations for extraction of observables from Low Earth Orbit (LEO) downlink signals, estimation of downlink synchronization signals (SS), and for navigation using downlink signals.

BACKGROUND

Low Earth orbit (LEO) broadband communication signals have been considered as possible sources for navigation by various theoretical and experimental studies. Recent launches of more than a thousand space vehicles (SVs) into LEO have increased interest. LEO orbits have higher received signal power compared to medium Earth orbit (MEO) where GNSS SVs reside. Moreover, LEO SVs are more abundant than GNSS SVs to make up for the reduced footprint and they provide both spatial and spectral diversity. Some existing positioning services use MEO satellites, however these systems require closely calibrated clocks for operation. One drawback of existing positioning systems such as global navigation satellite systems (GNSS) is that the GNSS signals become unstable in several situations, such as indoors, due to changes in earth terrain, near dense foliage, etc.

There is a desire for opportunistic navigation frameworks using LEO SV signals in order to avoid costly services or infrastructure of broadband providers. Broadband providers do not usually disclose transmitted signal structures. Even with frameworks of an LEO SV, conventional processes do not provide for drawing navigation observables from these LEO SV signals of opportunity. Extracting observables may come with challenges due to very-high dynamics of LEO SVs. There exists a desire and a need for systems and processes for positioning using LEO satellite downlink transmissions.

BRIEF SUMMARY OF THE EMBODIMENTS

Disclosed and described herein are systems, methods and configurations for navigation using low earth orbit (LEO)

satellite signals. According to embodiments, methods and device configurations are provided for extracting navigation observables from low earth orbit (LEO) downlink signals. According to embodiments, a method for extracting navigation observables using low earth orbit (LEO) satellite signals includes detecting, by a device, one or more low earth orbit (LEO) satellite downlink signals, and determining, by the device, at least one carrier phase observable from the one or more LEO satellite downlink signals, wherein determining the at least at least one carrier phase observable includes tracking a modified beat carrier phase of a sample of a detected LEO signal by performing an estimation operation for a time period and adaptive updating of measurement noise. The method also includes determining, by the device, at least one Doppler observable from the one or more LEO satellite downlink signals, the Doppler observable characterizing a frequency shift of the detected LEO signal. The method also includes determining, by the device, a position estimate of the device based on the at least one carrier phase observable and the at least one Doppler observable.

According to embodiments, receiving the one or more LEO downlink signals includes filtering a communication band for LEO downlink signals and selection of a carrier peak.

According to embodiments, receiving the one or more LEO downlink signals includes modeling signal structure of downlink signals, processing received downlink signals in a plurality of processing intervals, and characterizing Doppler frequency of downlink signals as a linear function.

According to embodiments, tracking a modified beat carrier phase includes performing an adaptive Kalman filter (KF) tracking loop operation, wherein the tracking loop operation adaptively iterates carrier phase error of downlink signal samples using an estimate of measurement noise variance in the tracking loop operation to determine a carrier phase estimate of the at least one downlink signal.

According to embodiments, determining at least one Doppler observable includes performing matched subspace detection to detect a synchronization signal (SS) of the LEO satellite downlink signals, and estimating period and Doppler frequency of downlink signals using the synchronization signal.

According to embodiments, determining at least one Doppler observable from the one or more LEO satellite downlink signals includes detecting activity of each LEO satellite vehicle, estimating a synchronization signal (SS) and generating an initial Doppler estimation of a downlink signal based on the synchronization signal (SS).

According to embodiments, determining at least one Doppler observable includes characterizing a Doppler state vector for the at least one downlink signal to determine Doppler frequency and Doppler rate for the detected LEO signal.

According to embodiments, determining a position estimate includes detecting activity of a plurality of LEO satellites, wherein the matched subspace detection is performed to determine a pseudorange observables from the plurality of LEO satellites.

According to embodiments, determining a position estimate includes determining a pseudorange observable based on a three-dimensional position vector for the device, a three-dimension position vector of at least one LEO satellite, and measurement noise for a plurality of time intervals.

According to embodiments, the method includes controlling, by the device, navigation using the position estimate, wherein a position vector is determined for the device based on a weighted nonlinear least-squares estimator solving for position estimates from a plurality of satellite vehicles.

Embodiments are also directed to a device configured for extracting navigation observables from low earth orbit (LEO) satellite signals. The device includes a receiver configured to receive one or more low earth orbit (LEO) satellite downlink signals, and a controller. The controller is configured to determine at least one carrier phase observable from the one or more LEO satellite downlink signals, wherein determining the at least at least one carrier phase observable includes tracking a modified beat carrier phase of a sample of a detected LEO signal by performing an estimation operation for a time period and adaptive updating of measurement noise. The controller is configured to determine at least one Doppler observable from the one or more LEO satellite downlink signals, the Doppler observable characterizing a frequency shift of the detected LEO signal. The controller is configured to determine a position estimate of the device based on the at least one carrier phase observable and the at least one Doppler observable.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
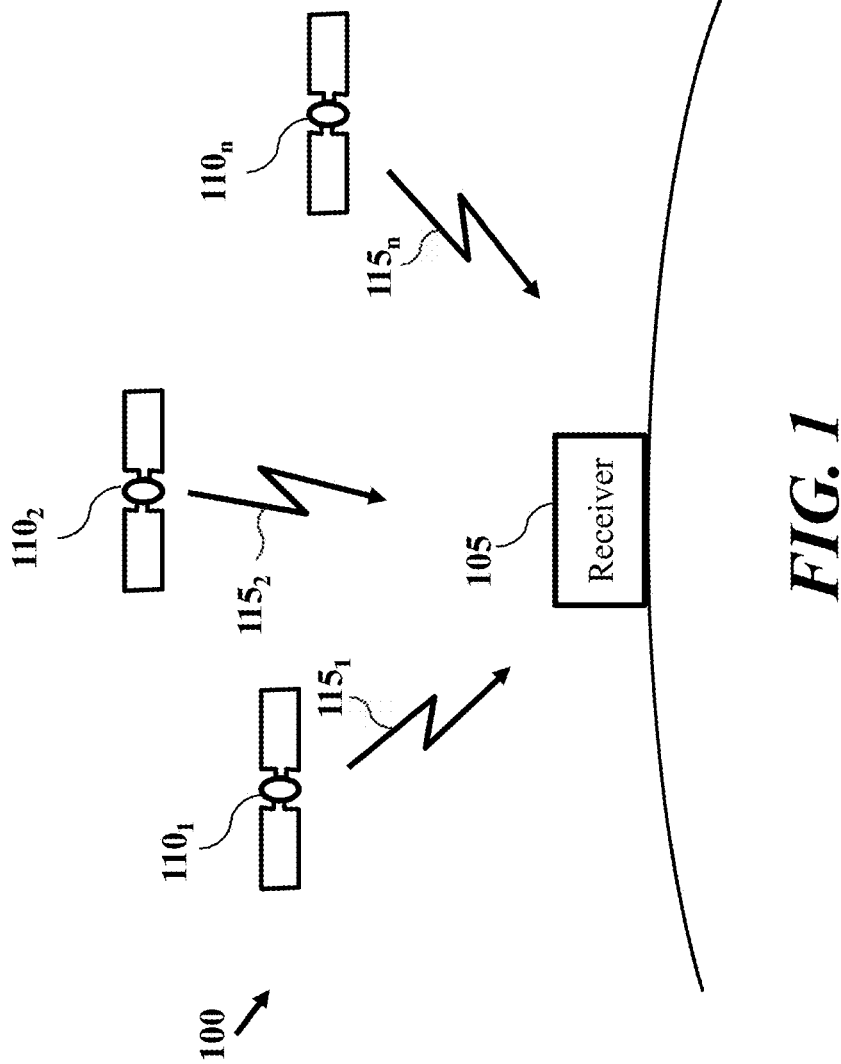
FIG. 1 illustrates a system including a receiver and low earth orbit (LEO) satellites according to one or more embodiments.

Embodiments of the disclosure are directed to navigation using Low Earth orbit (LEO) satellite signals, and in particular, downlink signals that are not transmitted for the purpose of providing positioning signals. According to embodiments, processes and configurations are provided to extract observables from LEO downlink transmissions to allow a device, such as a receiver or vehicle, to navigate without the use of global positioning data sources. Processes and configurations are also provided to leverage one or more signal features of LEO satellites and to allow for processing of signals when signal parameters, such as a synchronization signal (SS) are not known. According to one embodiment, processes and configurations are provided to determine a position estimate for a device, including one or more pseudorange estimates relative to LEO satellites.

Embodiments describe use of LEO downlink signals, which may be downlink signals transmitted for the purpose of providing satellite internet or data transmissions in general. Accordingly, as discussed herein LEO downlink signals may be transmitted by one or more satellite constellations configured to provide internet service, and not positioning data. It should be appreciated that operations and frameworks described herein, may be employed to operate with one or more satellite internet providers, including for example HughesNet®, Starlink®, Viasat®, etc. As such, downlink transmissions may be decoded to determine observables and as an aid in navigation. Processes and device configurations may also provide solutions that address and account for LEO downlink signal characteristics which require processing to allow to positioning to be determined.

Embodiments are directed to device structures and receiver processes. System configurations may employ one or more devices to perform receiver operations described herein. Embodiments may determine position estimates for one or more applications, including but not limited to applications for positioning, autonomous vehicles, automotive, aviation, military, and agricultural use.

Unlike existing opportunistic receivers which cannot operate when a signal is unknown, embodiments provide an opportunistic receiver configured to operate when downlink or positioning source signal is unknown. According to embodiments, an opportunistic navigation receiver enables the ability of operating in the scenarios where the received signal is unknown. The receiver is envisioned to operate in scenarios where size, weight, and power constraints (SWAPC) should not be violated, e.g., autonomous systems. Subsequently, along with accuracy, the proposed algorithms are faster and more accurate than the existing blind algorithms.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 illustrates a system including a receiver and a plurality of low earth orbit (LEO) satellites according to one or more embodiments. According to embodiments, configurations are provided for a system 100 including receiver 105 to use one or more downlink transmissions, such as downlink transmissions $115_1$-$115_n$, of Low Earth orbit (LEO) satellites $110_1$-$110_n$. Receiver 105 may be device, such as a receiver, vehicle component, or controller, configured to utilize parameters of downlink communication signals, such as downlink transmissions of a satellite internet service, to determine position estimates.

Figure 2:
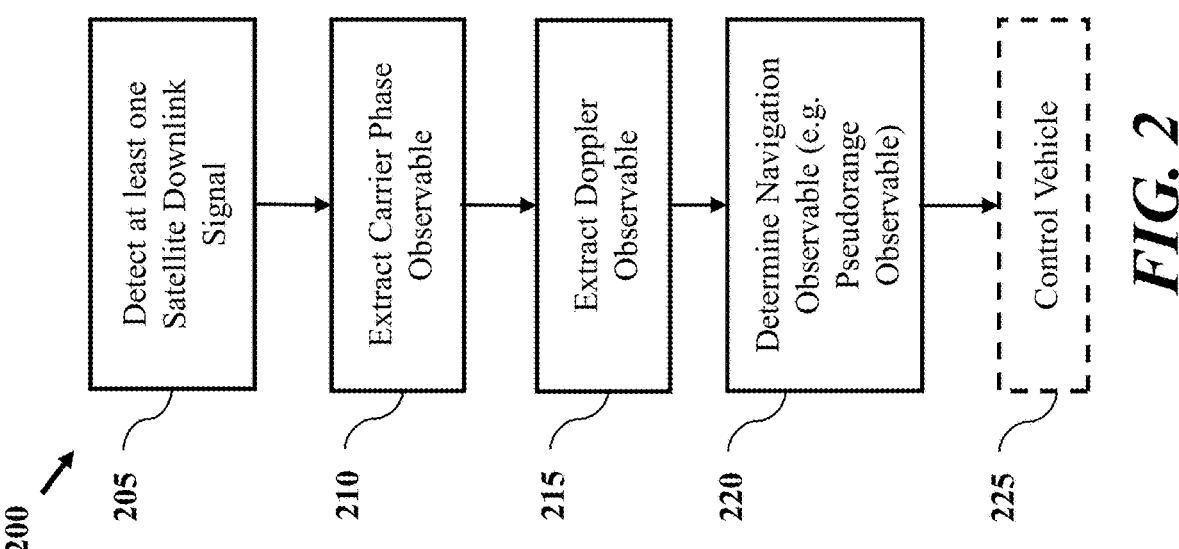
FIG. 2 illustrates a process for navigation using low earth orbit (LEO) satellite signals according to one or more embodiments.
Figures 4A, 4B:
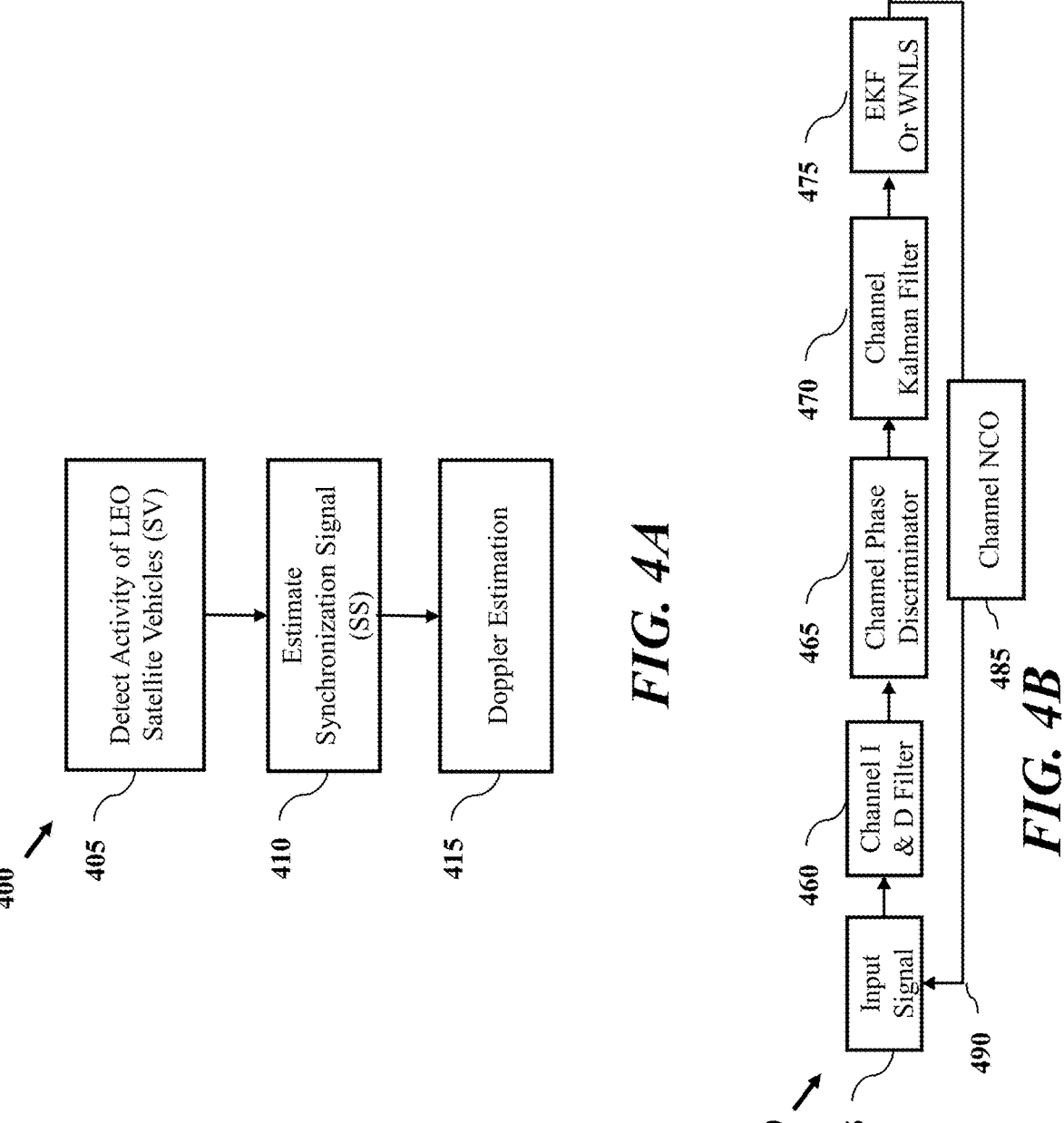
FIG. 4A illustrates a process for determining LEO signal structure according to one or more embodiments.
FIG. 4B illustrates a tracking loop according to one or more embodiments.

According to embodiments, receiver 105 may be a device configured to utilize one or more processes and operations described herein, such as process 200 of FIG. 2 and process 400 of FIG. 4A for navigation.

System 100 and processes described herein may be configured to produce navigation observables and navigation from LEO satellite signals, operate with non-positioning LEO satellite transmission, and provide navigation performance using LEO satellite downlink transmissions.

According to embodiments, receiver 105 may be configured to detect one or more downlink signals of a LEO source where one or more parameters of the downlink signals are unknown. Embodiments may operate with one or more characteristics known or partially known for an LEO source. As discussed below with reference to FIGS. 5A-5B, downlink signals amplitudes may vary relative to a source and the downlink signals may be subject to Doppler shifts. In addition, satellites $110_1$-$110_n$ may each have orbital patterns and receiver 105 may be moving and/or stationary. One or more embodiments are provided and described herein for decoding downlink signals to produce navigation observables such as Doppler and carrier phase.

According to embodiments, receiver 105 may be configured to detect one or more low earth orbit (LEO) satellite downlink signals, such as downlink transmissions $115_1$-$115_n$, of Low Earth orbit (LEO) satellites $110_1$-$110_n$. Unlike receivers configured for receiving a downlink transmission from a global positioning satellite in medium earth orbit, receiver 105 is not synchronized by control segments of the satellite vehicle. Similarly, receiver 105 may not have information for or require the downlink transmission frequency. Moreover, receiver 105 may not be configured to decode the downlink transmission data encoded in downlink signal. In contrast, information about LEO satellites $110_1$-$110_n$, such as orbital paths, may be known from two line element (TLE) files that are publicly available. Similarly, the transmission frequency band may be generally known for a downlink transmission source. As such, in contrast to timing delays of a known signal with a synchronized clock, receiver 105 utilize a framework that determines a navigation observable using an estimate of the SV position, and carrier phase observable to determine a pseudorange estimate from the receiver 105 to the SV. Using multiple downlink transmission sources, such as multiple LEO satellites $110_1$-$110_n$, receiver 105 may update the pseudorange estimates to provide a position estimate of the receiver on earth.

Embodiments herein are provided that account for transmission characteristics of two moving objects. By way of example and with respect to Doppler frequency shifts, while a satellite vehicle is approaching a ground station the downlink signals will be shifted up in frequency, and as it recedes they will shift down again. The precise moment when the frequency is exactly equal to the broadcast frequency is when the satellite's ground track passes the ground location's location (with some corrections). The broadcast frequency provides one measurement that may be leveraged to determine pseudorange estimates. Embodiments herein provide processes and device configurations to extract carrier phase observables from one or more satellite vehicles. In addition, processes and device configurations can extract a Doppler observable. Based on the navigation observables, a navigation solution may be provided.

FIG. 2 illustrates a process for navigation using Low Earth orbit (LEO) signals according to one or more embodiments. According to one embodiment, process 200 may be performed by a device, such as a receiver (e.g., receiver 105) that detects LEO signals.

Process 200 may be initiated by a device detecting one or more downlink signals or transmissions from LEO satellites at block 205. The receiver may be configured to listen for one or more satellite signals. In embodiments, signals detected by the receiver are based on an LEO satellite signal model for carrier phase tracking. The signal model may include estimates of Doppler frequency and may be based on TLE files of SVs. According to other embodiments, a general signal model of LEO SVs having an unknown signal structure may be used. As discussed herein, matched subspace detection may be performed to detect a synchronization signal (SS) of the LEO satellite downlink signals.

Figures 5A, 5B:
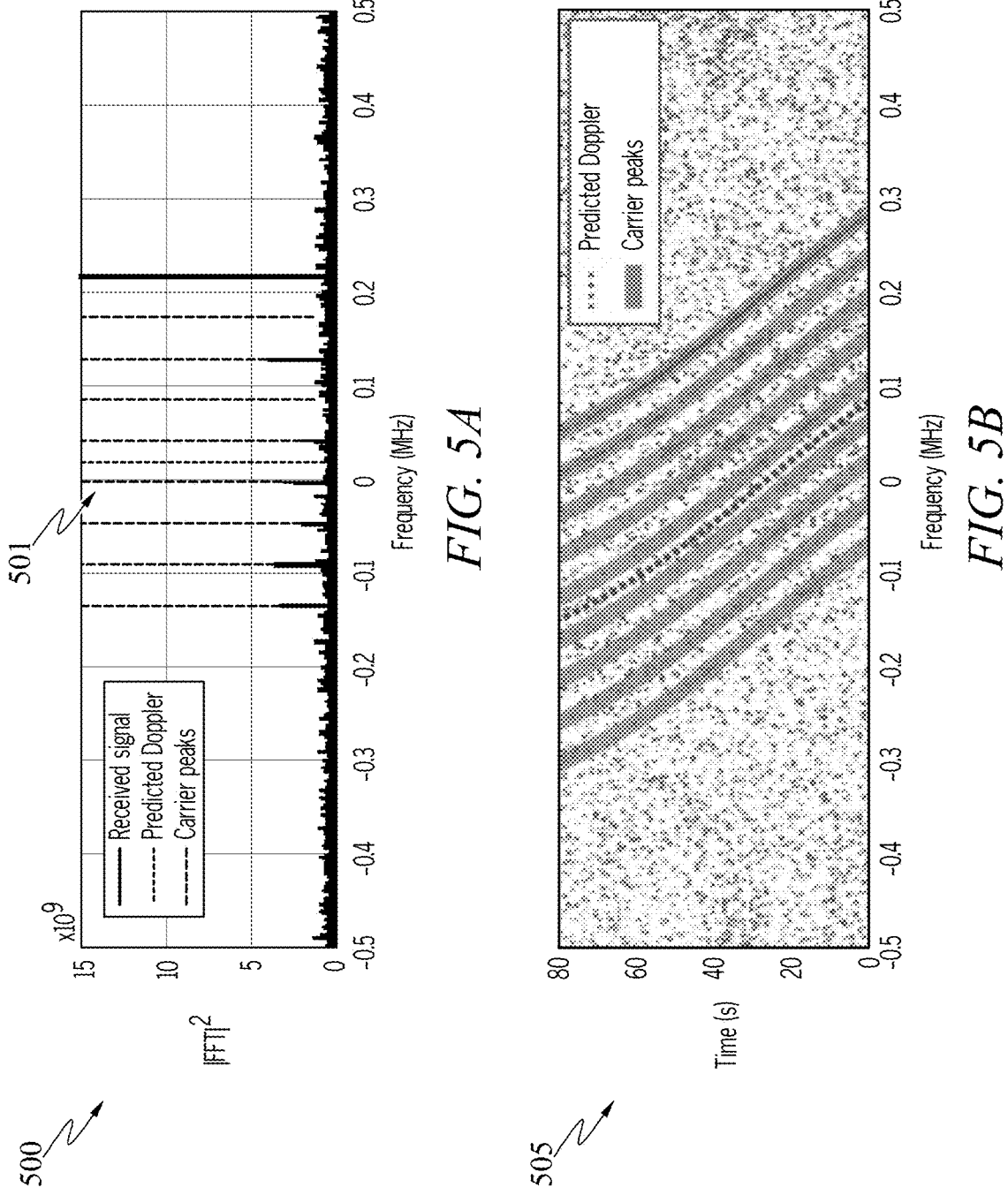
FIGS. 5A-5B illustrate downlink signal characteristics of LEO satellites according to one or more embodiments.

According to embodiments, detecting one or more downlink signals at block 205 includes sampling bands of radio frequency spectrum of at least one downlink channel frequency in an expected band of a LEO SV. FIGS. 5A-5B illustrate an exemplary representation of downlink signal characteristics. The receiver may not know the particular downlink signal, however a controller may select a carrier peak with the highest peak to determine a pseudorange estimate. Extracting navigation observables from low earth orbit (LEO) satellite signals may include detection of carrier frequency peaks for one or more SVs. Signals vary, as such detection may be performed by sampling downlink signals at different time instances. Detecting of downlink signals may be based on a model of the downlink signal, which may be a broadband communication signal. Receiving the one or more LEO downlink signals includes filtering a communication band for LEO downlink signals and selection of a carrier peak. Accordingly, detecting the one or more LEO downlink signals includes modeling signal structure of downlink signals, processing received downlink signals in a plurality of processing intervals, and characterizing Doppler frequency of downlink signals as a linear function.

At block 210, process 200 includes determining at least one carrier phase observable from the downlink signals. According to embodiments, the carrier phase observable may be determined by one or more operations for carrier phase tracking discussed herein. The carrier phase observable may be extracted from the received downlink signal and an adaptive Kalman filter (KF) may be used to track the carrier phase of LEO satellite vehicles (SV). By way of example, the device performs an adaptive Kalman filter (KF) tracking loop operation. The adaptive Kalman filter (KF)-tracking loop may update measurement noise based on a heuristic of residuals. According to embodiments, carrier phase observables may be extracted from one or more LEO satellites at a time.

According to embodiments, one or more time intervals of a downlink signal detected at block 205 may be sampled at block 210. A tracking loop, such as the tracking loop described with reference to FIG. 4B, may be employed to perform an estimation operation for at time period and adaptively update measurement noise to track a modified beat carrier phase of a sample of a detected LEO signal. By tracking carrier phase for a period of time, the tracking loop can update the determination of the at least one carrier phase observable. According to embodiments, tracking a modified beat carrier phase includes performing an adaptive Kalman filter (KF) tracking loop operation, wherein the tracking loop operation adaptively iterates carrier phase error of downlink signal samples using an estimate of measurement noise variance in the tracking loop operation to determine a carrier phase estimate of the at least one downlink signal. The tracking loop determines the at least at least one carrier phase observable by tracking a modified beat carrier phase of a sample of a detected LEO signal by performing an estimation operation for a time period and adaptive updating of measurement noise. A carrier phase measurement may be a measure of the range between a satellite (e.g., SV $110_1$) and a receiver (receiver 105) expressed in units of cycles of the carrier frequency. The signal phase may be the phase of the carrier signal such that the phase of the pure sinusoid that would result if code and any other modulations are "wiped off."

At block 215, at least one Doppler observable may be determined from the downlink signals. By way of example, Doppler observables may be extracted from multiple LEO satellites transmitting simultaneously. The Doppler observable may be determine based on a Doppler tracking algorithm. At block 220, the device can determine a position estimate of the device based on carrier phase observable and Doppler observables. The position estimate may be used to provide a value or reference, to allow for navigation based on the extracted observables, such as a pseudorange measurement approximating the distance between a LEO satellite and receiver. As discussed below, the Doppler can be used to obtain a pseudorange rate observable to each satellite vehicle which may be used by a device to determine a position estimate of the device relative to satellite vehicles. According to one embodiment, determining at least one Doppler observable from the one or more LEO satellite downlink signals is performed to characterizing a frequency shift of the detected LEO signal relative to the transmitted frequency. Determining at least one Doppler observable can include performing matched subspace detection to detect a synchronization signal (SS) of the LEO satellite downlink signals, and estimating period and Doppler frequency of downlink signals using the synchronization signal. According to another embodiment, determining at least one Doppler observable from the one or more LEO satellite downlink signals includes detecting activity of each LEO satellite vehicle, estimating a synchronization signal (SS) and generating an initial Doppler estimation of a downlink signal based on the synchronization signal (SS). Determining at least one Doppler observable can include characterizing a Doppler state vector for the at least one downlink signal to determine Doppler frequency and Doppler rate for the detected LEO signal.

At block 220, determining a position estimate may include detecting activity of a plurality of LEO satellites. Matched subspace detection may be performed to determine a pseudorange observables from the plurality of LEO satellites. Determining a position estimate can include determining a pseudorange observable based on a three-dimensional position vector for the device, a three-dimension position vector of at least one LEO satellite, and measurement noise for a plurality of time intervals.

At optional block 225, a device can control navigation using the position estimate. Experimental results are discussed herein demonstrating carrier phase tracking and positioning results with real LEO satellite signals. Experimental results have included a horizontal position error of 9.5 m with six LEO SVs. According to embodiments, controlling navigation using the position estimate can include determining a position vector for the device based on a weighted nonlinear least-squares estimator solving for position estimates from a plurality of satellite vehicles.

Experimental results are discussed herein for operations of process 200.

Figure 3:
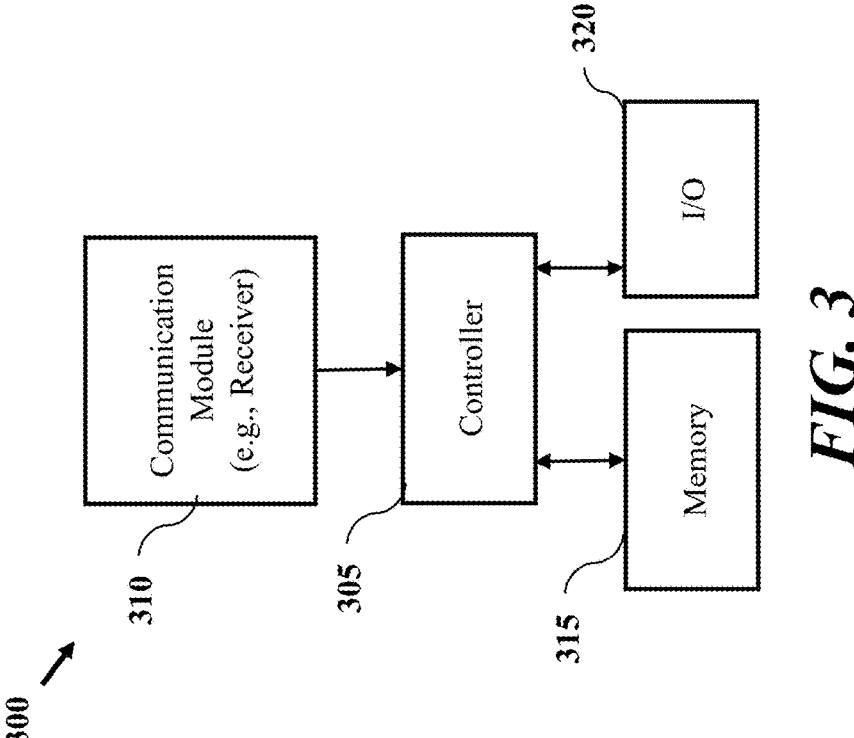
FIG. 3 depicts a device configuration according to one or more embodiments.

FIG. 3 depicts a device configuration according to one or more embodiments. Device 300 may relate to a receiver (e.g., receiver 105) configured to detect LEO satellite transmissions, such as downlink signals. According to one embodiment, receiver 300 includes controller 305, memory 310 and communications module 315. Controller 305 may relate to a processor or control device configured to execute one or more operations stored in memory 310, such as a determining observables and controlling navigation based on measurement of low Earth orbit (LEO) satellite signals. Controller 305 may be coupled to memory 310 and communication module 315. Communication module 315 may be configured to receive one or more low earth orbit (LEO) satellite signals, including signals from internet satellite providers. According to one embodiment, controller 305 is configured to determine a position of the device and track carrier phase one or more navigation functions. Controller 305 may be configured to perform an adaptive Kalman filter (KF) tracking loop operation. According to embodiments, controller 305 may be configured to perform matched subspace detection to detect a synchronization signal (SS) of the LEO satellite downlink signals. According to embodiments, communications module 315 may include a universal software radio peripheral (USRP) with a Ku antenna to receive LEO downlink signals.

FIG. 4A illustrates a process for determining LEO signal structure according to one or more embodiments. Embodiments are provided for detecting and processing signal structures of LEO SVs. Reference below is made to LEO satellites associated with internet constellations that provide downlink transmissions. Process 400 includes detecting activity of LEO SV at block 405. Assuming that the downlink signals contains a periodic synchronization signal (SS), the disclosure formulates a matched subspace detection problem to detect the unknown SS of LEO SVs and estimating the unknown period and Doppler frequency. The matched subspace detector enables acquiring the LEO SVs which includes (i) detecting the activity of each LEO SV at block 405, (ii) providing an estimation of the SS and its parameters at block 410, (iii) and providing an initial Doppler estimation at block 415. Embodiments enable estimation of LEO downlink SS.

FIG. 4B illustrates a tracking loop according to one or more embodiments. Tracking loop 450 includes input signal 455 which may be a sample of the downlink signal. Tracking loop 450 includes channel integrate and dump (I & D) filter 460, channel phase discriminator 465, channel Kalman Filter 470 and a navigation filter 475 to provide at least one of an EKF function and WNLS function. Tracking loop 450 also includes a numerically controlled oscillator (NCO) 485. A receiver may include a tracking loop for each channel of a SV. Collected signals are processed by local signal correlation for coherent integration by integrate and dump (I & D) filter 460. The discriminator output of channel phase discriminator 465 is used as the input of channel Kalman Filter 470. The output information is carrier phase error. Through a linear transformation, carrier phase error may be converted into a pseudo-range error and a pseudo-range rate error, which are used as the measurement information of the navigation filter 475.

According to embodiments, tracking loop 450 is configured to track a modified beat carrier phase by iteratively performing an adaptive Kalman filter (KF) tracking loop operation. The carrier phase may be modified due to effects of the Doppler frequency shift. Tracking loop 450 is configured to adaptively iterate carrier phase error of downlink signal samples using an estimate of measurement noise variance in the tracking loop operation to determine a carrier phase estimate of the at least one downlink signal. For each downlink source, such as each SV, a navigation receiver can include an independent phase-locked loop (PLL) to track the LEO satellite signal for each channel. The Doppler shifts produced by each PLL may be input to navigation filter 475, which can be an EKF or a weighted nonlinear least-squares (WNLS) estimator. For a plurality of time steps samples of the downlink signal may be mixed with the estimated residual carrier wave due to Doppler and coherently summed over the time intervals. Channel NCO 485 is updated with the calculated pseudo-range and pseudo-range rate to generate a local replica signal and to minimize measurement noise. Output 480 of tracking loop 480 includes an estimate of carrier phase for downlink signals. The output of tracking loop 450 may be used by a receiver to determine a navigation observable.

LEO Signal Model for Carrier Phase Tracking

Embodiments may utilize an LEO signal model for carrier phase tracking. Little is known about LEO downlink signals of satellite internet constellations, such as Starlink®, or their air interface in general, except for the channel frequencies and bandwidths. One cannot readily design a receiver to track LEO signals with channel frequencies and bandwidths only, but a deeper understanding of the signals is needed. Embodiments utilize Software-defined radios (SDRs) to sample bands of the radio frequency spectrum. However, there are two main challenges for sampling LEO signals: (i) the signals are transmitted in Ku/Ka bands, which is beyond the carrier frequencies that most commercial SDRs can support, and (ii) the downlink channel bandwidths can be up to 240 MHz, which also surpasses the capabilities of current commercial SDRs.

According to embodiments, the first challenge can be resolved by using a mixer/downconverter between the antenna and an SDR. However, the sampling bandwidth can only be as high as the SDR allows. In general, opportunistic navigation frameworks do not require much information from the communication/navigation source (e.g., decoding telemetry or ephemeris data or synchronizing to a certain preamble). Therefore, the aim of the receiver is to exploit enough of the downlink signal to be able produce raw navigation observables (e.g., Doppler and carrier phase). Fortunately, a look at the FFT of the downlink signal 500 at 11.325 GHz carrier frequency and sampling bandwidth of 2.5 MHz shows nine "carrier peaks", as shown as 501 in FIG. 5A. Furthermore, the waterfall plot 505 in FIG. 5B shows that these carrier peaks vary as the Doppler frequency over a 80 second interval. The Doppler frequency was predicted using two-line element TLE files. According to experimental results, it was observed that the relative amplitudes of these nine peaks vary from one SV to the other. Therefore, according to embodiments, only the strongest peak will be tracked. Moreover, the disclosure makes no assumptions on the position of the peaks relative to the center frequency of the signal.

The LEO SV's transmitted signal will suffer from very high Doppler shifts, as shown in FIG. 5B. After downmixing, low-pass filtering, and bandpass sampling, the nth sample of the discrete-time received signal r[n] can be expressed as $$r[n] = \alpha \exp\left[ j(2\pi f_p n Ts + \bar{\theta}[n]) \right] + w[n]$$

where r[n] is the received signal at the nth time instant; $\alpha$ is the complex channel gain between the receiver and the LEO SV, Ts is the sampling interval, $\bar{\theta}[n]$ is the true beat carrier phase at time-step n, and w[n] captures the effect of the channel noise and interference and is modeled as a complex, zero-mean white Gaussian sequence with variance $$\sigma_w^2.$$

According to embodiments, the receiver that tracks the carrier phase described next will operate on the samples r[n].

Carrier Phase Tracking

Embodiments may be configured to perform carrier phase tracking. It is important to note that the receiver does not have knowledge of frequency shift fp. As such, the modified beat carrier phase is defined as $\theta[n] \triangleq \bar{\theta}[n] + 2\pi f_p n T_s$, which will be the quantity tracked by the receiver. An adaptive Kalman filter (KF) is used to track the carrier phase of LEO SVs. The KF state is defined as $$\theta(t) \triangleq \left[ \theta(t), \dot{\theta}(t), \ddot{\theta}(t) \right]^T$$

with the dynamics given by $$\dot{\theta}(t) = A\theta(t) + b\tilde{w}(t)$$

$$A \triangleq \begin{bmatrix} 0 & 1 & 0 \\ 0 & 0 & 1 \\ 0 & 0 & 0 \end{bmatrix}, \, b \triangleq \begin{bmatrix} 0 \\ 0 \\ 1 \end{bmatrix}$$

and $\tilde{w}(t)$ is a zero-mean white process with power spectral density $q_{\tilde{w}}$. The above system is discretized and a KF is used to estimate $\theta(k)$, which corresponds to $\theta(t)$ at time $t_k = t_0 + kT$, where to is some initial time and T is the accumulation time. The adaptive KF-based tracking algorithm operates in a similar fashion to Costas loops, except that the loop filter is replaced with a KF where the measurement noise variance is varied adaptively. Let $\hat{\theta}(k|l)$ denote the KF estimate of $\theta(k)$ given all the measurements up to time-step $l \leq k$, and P(k|l) denote the corresponding estimation error covariance. The KF state estimate and covariance are propagated using standard KF equation. The measurement update step is discussed next.

To perform the KF update, a carrier wipe off is first performed according to $$s_{k+1} = \frac{1}{N} \sum_{n=0}^{N-1} r[n+kN] \exp\left[ -j\hat{\theta}(k+n|k) \right]$$

where N is the number of received samples in an accumulation period and $$\hat{\theta}(k+n|k) = \hat{\theta}(k|k) + \dot{\hat{\theta}}(k|k)nT_s + \frac{1}{2}\ddot{\hat{\theta}}(k|k)(nT_s)^2.$$

Since the tracked signal is assumed to be data-less, an atan2 discriminator can be used to obtain an estimate of the carrier phase error according to $$v_{k+1} \triangleq \operatorname{atan2}(\mathcal{I}\{s_{k+1}\}, \mathcal{R}\{s_{k+1}\}) \approx \theta(k+1) - \hat{\theta}(k+1|k) + v(k+1)$$

where $\mathcal{R}\{\bullet\}$ and $\mathcal{I}\{\bullet\}$ denote the real and imaginary parts, respectively, and v(k+1) is the measurement noise, which is modeled as a zero-mean, white Gaussian random variable with variance $$\sigma_v^2(k+1).$$

Since the measurement noise variance is not known, an estimate $$\sigma_v^2(k+1)$$

is important to note that $v_{k+1}$ is the KF innovation and gives a direct measure of the modified beat carrier phase. The measurement update is carried with the innovation $v_{k+1}$ and measurement Jacobian H=[100]. The measurement noise variance estimate is updated according to $$\hat{\sigma}_v^2(k+1) = \gamma \hat{\sigma}_v^2(k) + (1-\gamma)u(k)$$

where 0<S<1 is a forgetting factor (close to one) and $$u(k) \triangleq \frac{1}{k_{v1}} \sum_{m=k-K_y+1}^{k} V^2_m$$

and $k_v$ is the number of samples used to estimate the measurement noise variance. Initial estimate $\hat{\theta}(0|0)$ is set to zero with zero uncertainty. Initial estimates of the first and second derivatives of $\theta(k)$ can be obtained by performing a search over the Doppler and the Doppler rate to maximize the FFT of the received signal.

Navigation Solution with Carrier Phase

Embodiments may be configured to determine a navigation observable and/or control navigation using estimates of carrier phase. The carrier phase observable to the ith SV at time-step k=kD, expressed in meters, is modeled as $$z_i(k) = \left\| r_r - r_{SV_i}(\kappa) \right\|_2 + a_i \kappa D \cdot T + b_i + v_{z_i}(\kappa)$$

where D is a decimation factor to avoid time-correlations, $r_r$ and $r_{sv_i}(\kappa)$ are the receiver's and ith LEO SV three-dimensional (3-D) position vectors, ai and bi are the coefficients of the first order polynomial modeling the errors due to the initial carrier phase, clock bias, and unknown frequency shift fp, and $v_{zi}(\kappa)$ is the measurement noise, which is modeled as a zero-mean, white Gaussian random variable with variance $$\sigma_i^2(\kappa),$$

which is obtained from the KF covariance matrix. Next, define the parameter vector $$x \triangleq \left[ r_r^T, a_1, b_1, \dots, a_L, b_L \right]^T,$$

where L is the total number of visible SVs. Subsequently, a weighted nonlinear least squares (WNLS) with a diagonal weight matrix whose elements are the inverses of $$\sigma_i^2(\kappa)$$

is used to solve for x using all carrier phase measurements.

Generic Signal Model of LEO SVs with Unknown Signal Structure

Embodiments may be configured to use a generic model of LEO SVs with an unknown signal structure. As an alternative to the signal model discussed previously, if no assumptions are made on the signal structure, the received signal can then be modeled as $$r[n] = \alpha c[\tau_n - t_s[n]]\exp(\theta[\tau_n]) + d[\tau_n - t_s[n]]\exp(\theta[\tau_n]) + w[n]$$

where $\tau_n$ is the sample time expressed in the receiver time; c[n] is a periodic reference signal (RS) with a period of L samples; $t_s[n]$ is the code-delay corresponding to the receiver and the LEO SV at the nth time instant; $\theta[\tau_n]=2\pi f[n]T_s n$ is the carrier phase in radians, where f[n] is the instantaneous Doppler frequency at the nth time instant and $T_s$ is the sampling time; $d[\tau_n]$ represents the samples of some data transmitted from the LEO SV; and w[n] is zero-mean independent and identically distributed noise with $$E\{w[m]w[n]\} = \sigma_w^2\delta[m-n],$$

where $\delta[n]$ is the Kronecker delta function.

Processing the received signal is performed in some processing intervals. As it was mentioned previously, LEO SV signals suffer from very high Doppler shifts. Therefore, it is assumed that during the kth processing interval the instantaneous Doppler frequency is a linear function of time, i.e., $f_k[n]=f_{D_k}+\beta_k n$, Where $f_{Dk}$ is referred to as Doppler, and $\beta_k$ is the Doppler rate at the kth processing interval. The coherent processing interval is defined as the time interval that the Doppler, i.e., $f_{Dk}$, and the Doppler rate, i.e., $\beta_k$, are constant.

The received signal at the nth time instant when the Doppler rate is wiped-off is denoted by $r'[n]=\exp(-j2\pi\beta_k n^2)r[n]$. One can define the desired RS which is going to be detected in the acquisition stage as $$s[n] \triangleq \alpha c[\tau_n - t_s[n]]\exp(j2\pi f_{D_k}T_s n).$$

And the equivalent noise as $$w_{eq}[n] = d[\tau_n - t_s[n]]\exp(j2\pi f_{D_k}T_s n) + \exp(-j2\pi\beta n^2)w[n].$$

Due to the periodicity of the RS, one has $$s[n + mL] = s[n]\exp(j\omega_k mL) \quad 0 \le n \le L - 1,$$

where $\omega_k = 2\pi f_{D_k}T_s$ is the normalized Doppler frequency at the kth CPI. A vector of L observation samples corresponding to the mth period of the signal is formed as $$z_m \triangleq [r'[mL], r'[mL + 1], \dots, r'[(m + 1)L - 1]]^T.$$

The kth CPI vector is constructed by concatenating M vectors of length L to form the ML×L vector $$y_k = \left[z_{kM}^T, z_{kM+1}^T, \dots, z_{(k+1)M-1}^T\right]^T.$$

Therefore, the signal model is $$y_k = H_k s + w_{eq_k},$$

where s=[s[1], s[2], . . . s[L]], and the ML×L Doppler matrix is defined as $$H_k \triangleq [I_L, \exp(j\omega_k L)I_L, \dots, \exp(j\omega_k(M - 1)L)I_L]^T.$$

Acquisition of LEO SVs from Unknown Signals

Embodiments may be configured to acquire and detect transmission of LEO SVs from an unknown signal structure. By unknown, the receiver may be required to detect transmissions in one or more frequency bands to detect signals of an SV. At k=0, the following binary hypothesis test is used to detect the LEO SV $$\begin{cases} \mathcal{H}_0: \ y_0 = w_{eq_0} \\ \mathcal{H}_t: \ y_0 = H_0 s + w_{eq_0} \end{cases}.$$

For a given set of unknown variables $$\mathcal{W}_0 = \{L, \omega_0, \beta_0\}.$$

The generalized likelihood ratio (GLR) test is $$\mathcal{L}(y_0|\mathcal{W}_0) = \frac{y_0^H P_{H_0} y_0}{y_0^H P_{H_0}^{\perp} y_0} \underset{\mathcal{H}_0}{\overset{\mathcal{H}_1}{\gtrless}} \eta,$$

where $y^H$ is the Hermitian transpose of the vector y.

$$P_{H_0} = H_0 \left(H_0^H H_0\right)^{-1} H_0^H$$

denotes the projection matrix to the column space of $H_0$ and $$P_{H_0}^{\perp} \triangleq I - P_{H_0}$$

denotes the projection matrix to the column space of $H_0$. Also, n is the threshold which is predetermined according to the probability of false alarm. The estimate of the unknown set containing the period of the LEO satellite downlink SS, the Doppler and the Doppler rate is given by $$\hat{\mathcal{W}}_0 = \arg\max_{L,\omega_0,\beta_0} \frac{1}{M}\left\|H_0^H y_0\right\|^2.$$

Doppler Tracking Algorithm from Unknown Signals

Embodiments may be configured to perform Doppler tracking of LEO SV signals. A KF-based tracking algorithm which follows a regular KF for the time update and a novel measurement update is presented. The Doppler state vector is $$\omega_k \triangleq [\omega_k, \dot{\omega}_k]^T.$$

The KF measurement update equations is carried out based on the ML estimate of the Doppler. The Doppler wipe-off is performed as $$\bar{r}_k[i] = r[i + kML]\exp\left[-j\hat{\theta}_{k+i|k}\right],$$

where $$\hat{\theta}_{k+i|k} = \hat{\omega}_{k|k}iT_s + \hat{\dot{\omega}}_{k|k}\frac{i^2}{2}T_s^2$$

The observation vector is constructed as $$\bar{y}_{k+1} = [\bar{r}_k[0], \hat{r}_k[2], \dots, \hat{r}_k[ML - 1]]^T.$$

Consequently, $$\bar{y}_{k+1} = \bar{H}_{k+1}s + \bar{w}_{eq_{k+1}},$$

where the residual Doppler matrix is $$\bar{H}_{k+1} \triangleq [I_L, \exp(j\Delta\omega_k L)I_L, \dots, \exp(j\Delta\omega_{k+1}(M - 1)L)I_L]^T,$$

and $$\Delta\omega_{k+1} = \omega_{k+1} - \hat{\omega}_{k+1|k}.$$

Hence, the proposed KF innovation for Doppler tracking is given by $$\nu_{k+1} = \arg\max_{\Delta\omega_{k+1}} \frac{1}{M}\left\|\tilde{H}_{k+1}^H \tilde{y}_{k+1}\right\|^2,$$

which is a direct measure of Doppler error.

Navigation Solution with Doppler

Embodiments may be configured to provide a navigation solution using Doppler estimations. The Doppler can be used to obtain pseudorange rate observable to the ith SV at time-step k=kD, expressed as meters per second, is modeled as $$z_i(\kappa) = \frac{\dot{r}_{SV_1}^T(\kappa)[r_r - rSV_1(\kappa)]}{\|r_r - rSV_1(\kappa)\|_2} + a_i + \nu_{z_1}(\kappa)$$

where $\dot{r}_{SVi}(\kappa)$ is the ith LEO SV 3-D velocity vector and the remaining terms are defined as above. Next, define the parameter vector $$x \triangleq \left[r_r^T, a_1, \dots, a_{L_1}\right]^T,$$

where L is the total number of visible SVs. Subsequently, a WNLS used to solve for x using all pseudorange rate measurements $z_i(\kappa)$, $\forall i$, $\kappa$.

Experimental Results

An experimental setup for processes and configurations described herein included a stationary universal software radio peripheral (USRP) was equipped with a consumer-grade Ku antenna and low-noise block downconverter (LNB) to receive LEO signals in the Ku band. The sampling bandwidth was set to 2.5 MHz and the carrier frequency was set to 11.325 GHz, which is one of the LEO downlink frequencies. The samples of the Ku signal were stored for off-line processing. The tracking results are presented next.

Doppler and Signal Period Acquisition Results

Figure 6:
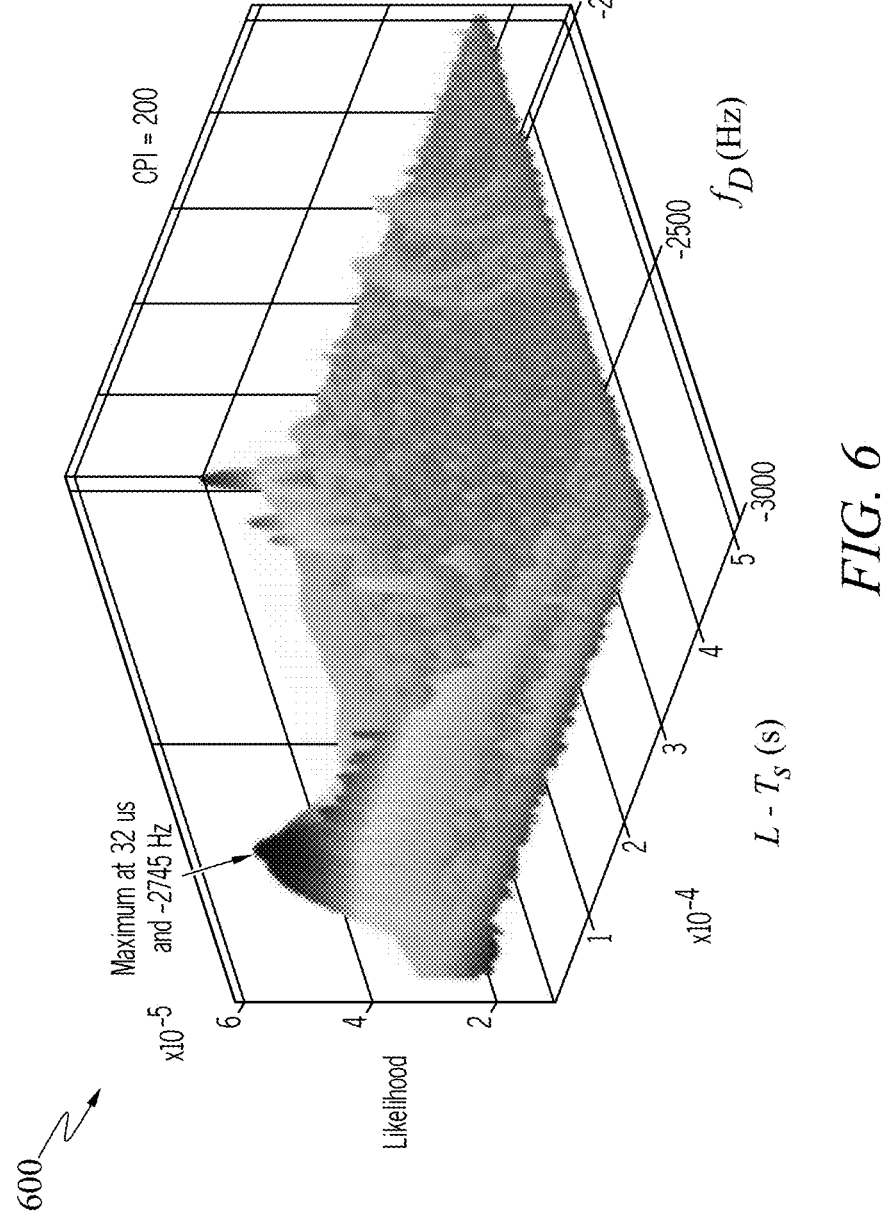
FIG. 6 illustrates experimental results according to embodiments.

FIG. 6 illustrates experimental results including results of the Doppler and period acquisition step. The acquisition step is providing an estimation 600 of the period of the downlink signal, and an initial estimate of the Doppler.

Carrier Phase Tracking Results

Figure 7:
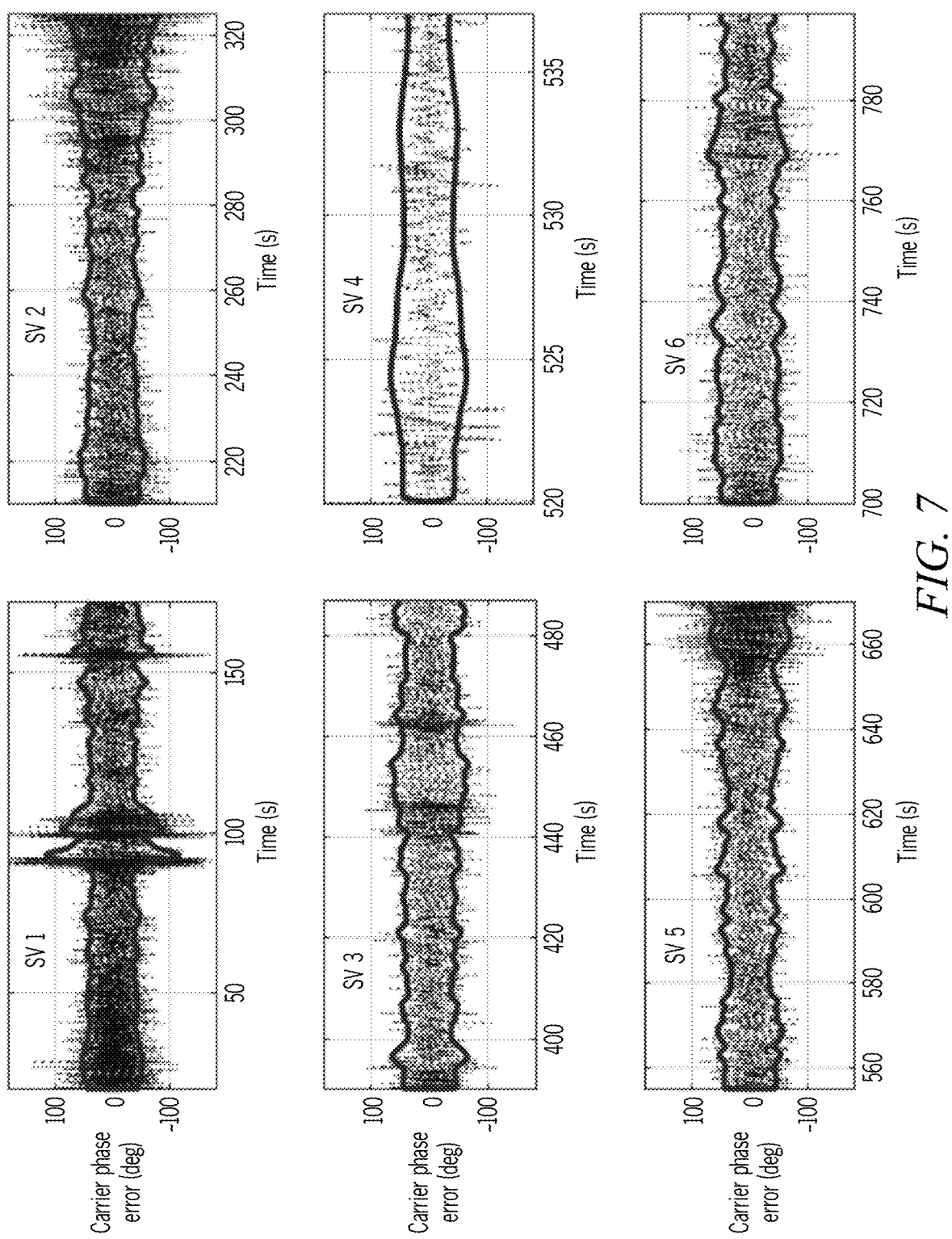
FIG. 7 illustrates carrier phase tracking results according to embodiments.

The USRP was set to record Ku signals over a period of 800 seconds. During this period, a total of six LEO SVs transmitting at 11.325 GHz passed over the receiver, one at a time. The framework discussed above was used to acquire and track the carrier phase of the signals from these satellites. FIG. 7 illustrates carrier phase tracking results according to embodiments. The time history of $\nu_k$ (phase error) for each SV is shown in FIG. 7.

Doppler Tracking Results

Figures 8A, 8B:
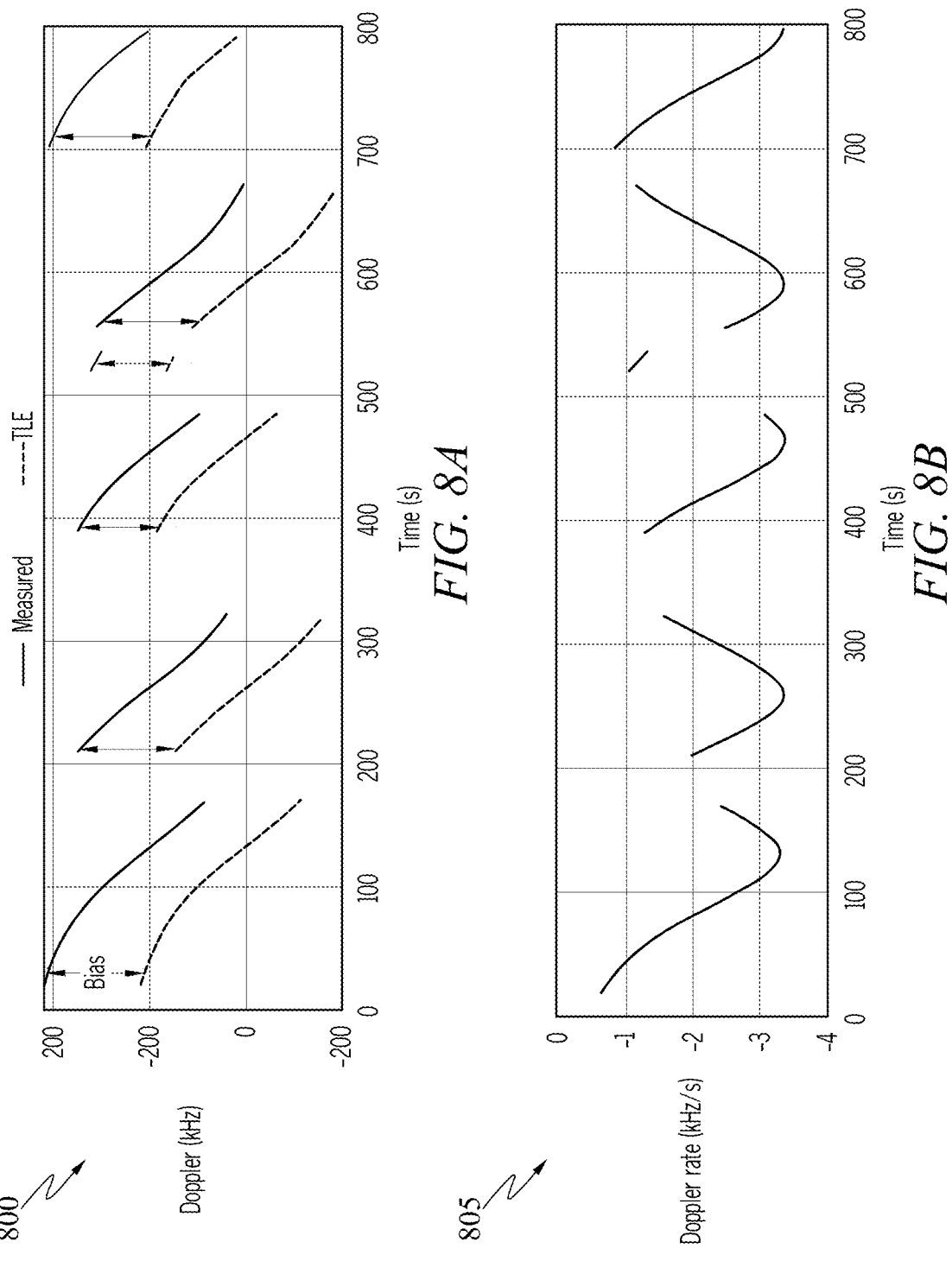
FIGS. 8A-8B illustrate Doppler tracking results according to embodiments.

FIGS. 8A-8B illustrate Doppler tracking results according to embodiments. The results of Doppler determinations 805 are shown in FIG. 8A, while results for Doppler rate tracking 810 are shown in FIG. 8B. FIGS. 8A-8B demonstrate the tracked Doppler using the proposed tracking algorithm and the predicted Doppler measurements from the TLE. As it can be seen in FIGS. 8A-8B, there is a constant bias in the estimated Doppler measurements.

Navigation Solution

Figure 9A:
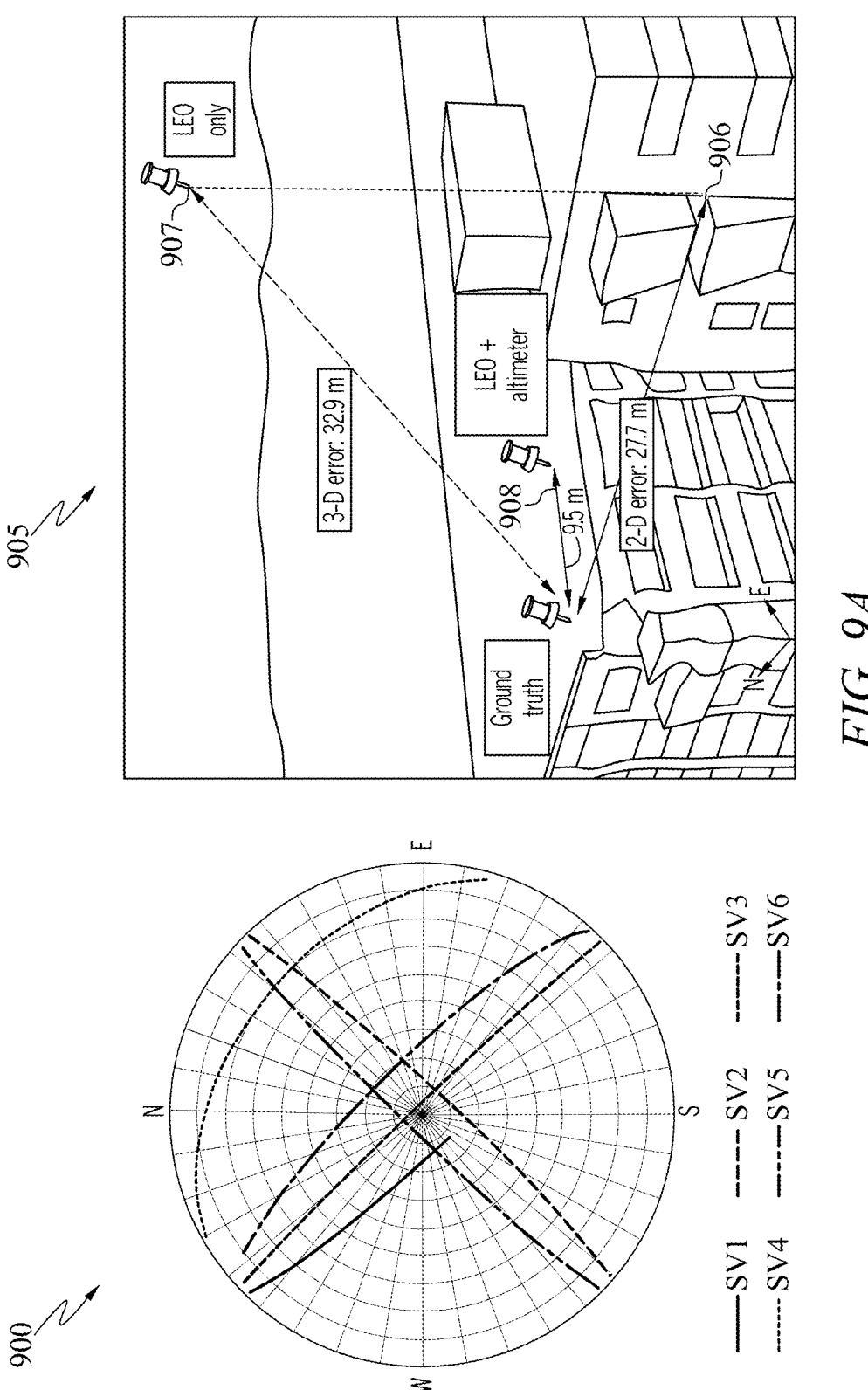
FIGS. 9A-9B illustrates positioning and navigation results according to one or more embodiments.
Figure 9B:
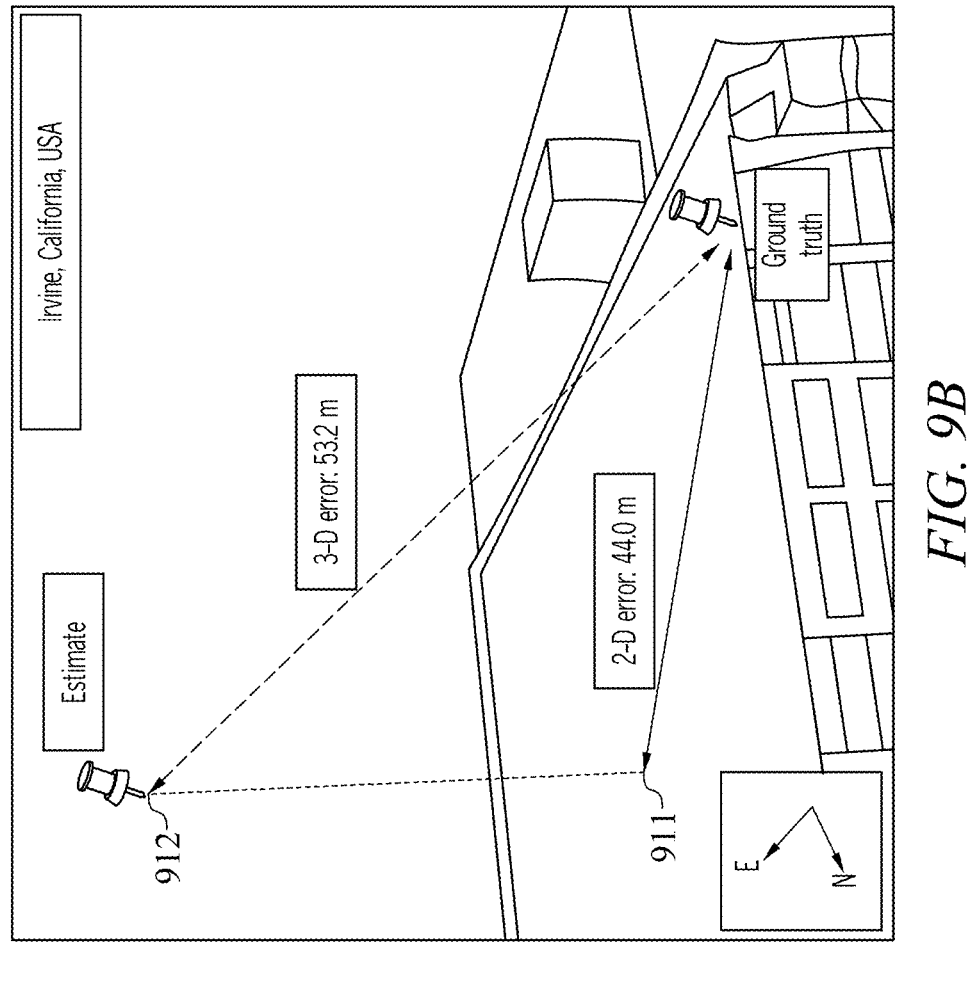

FIGS. 9A-9B illustrates positioning and navigation results according to one or more embodiments. According to embodiments, the receiver position was estimated using the aforementioned WNLS. The receiver position was initialized as the centroid of all SV positions, projected onto the surface of the Earth, yielding an initial position error of 179 km. The clock biases and drifts were initialized to zero. The final 3-D position error with carrier phase was found to be 32.9 m, while the 2-D position error was 27.7 m. Also, the navigation solution with the Doppler was found to be 44 m 2-D and 53.2 m 3-D. If the receiver is equipped with an altimeter, i.e., knows its altitude, the 2-D position error goes down to 9.5 m. A skyplot of the LEO SVs is shown as 900. Representations of the environment layout and the positioning results are shown as 905, and 910 in FIGS. 9A-9B, respectively. Results 905 include a 2D position estimate 906, a position estimate 907 for a vehicle relative to ground truth using LEO data only, and also a representation of positioning results 908 using LEO downlink transmissions and an altimeter. Results 910 include a 2D position estimate 911 and position estimate 912 for a vehicle relative to ground truth using LEO data only.

While this disclosure has been particularly shown and described with references to exemplary embodiments thereof, it will be understood by those skilled in the art that various changes in form and details may be made therein without departing from the scope of the claimed embodiments.

What is claimed is:

1. A method for extracting navigation observables from low earth orbit (LEO) satellite signals, the method comprising:

detecting, by a device, one or more low earth orbit (LEO) satellite downlink signals;

determining, by the device, at least one carrier phase observable from the one or more LEO satellite downlink signals, wherein determining the at least one carrier phase observable includes tracking a modified beat carrier phase of a sample of a detected LEO signal by performing an estimation operation for a time period and adaptive updating of measurement noise;

determining, by the device, at least one Doppler observable from the one or more LEO satellite downlink signals, the Doppler observable characterizing a frequency shift of the detected LEO signal; and determining, by the device, a position estimate of the device based on the at least one carrier phase observable and the at least one Doppler observable.

2. The method of claim 1, wherein receiving the one or more LEO satellite downlink signals includes filtering a communication band for LEO satellite downlink signals and selection of a carrier peak.

3. The method of claim 1, wherein receiving the one or more LEO satellite downlink signals includes modeling signal structure of downlink signals, processing received downlink signals in a plurality of processing intervals, and characterizing Doppler frequency of downlink signals as a linear function.

4. The method of claim 1, wherein tracking a modified beat carrier phase includes performing an adaptive Kalman filter (KF) tracking loop operation, wherein the adaptive KF tracking loop operation adaptively iterates carrier phase error of downlink signal samples using an estimate of measurement noise variance in the adaptive KF tracking loop operation to determine a carrier phase estimate of the at least one LEO satellite downlink signal.

5. The method of claim 1, wherein determining at least one Doppler observable includes performing matched subspace detection to detect a synchronization signal (SS) of the LEO satellite downlink signals, and estimating period and Doppler frequency of downlink signals using the synchronization signal.

6. The method of claim 1, wherein determining at least one Doppler observable from the one or more LEO satellite downlink signals includes detecting activity of each LEO satellite vehicle, estimating a synchronization signal (SS) and generating an initial Doppler estimation of a downlink signal based on the synchronization signal (SS).

7. The method of claim 1, wherein determining at least one Doppler observable includes characterizing a Doppler state vector for the at least one LEO satellite downlink signal to determine Doppler frequency and Doppler rate for the detected LEO signal.

8. The method of claim 1, wherein determining a position estimate includes detecting activity of a plurality of LEO satellites, wherein a matched subspace detection is performed to determine a pseudorange observable from the plurality of LEO satellites.

9. The method of claim 1, wherein determining a position estimate includes determining a pseudorange observable based on a three-dimensional position vector for the device, a three-dimension position vector of at least one LEO satellite, and measurement noise for a plurality of time intervals.

10. The method of claim 1, further comprising controlling, by the device, navigation using the position estimate, wherein a position vector is determined for the device based on a weighted nonlinear least-squares estimator solving for position estimates from a plurality of satellite vehicles.

11. A device configured for extracting navigation observables from low earth orbit (LEO) satellite signals, the device comprising:

a receiver configured to receive one or more low earth orbit (LEO) satellite downlink signals; and a controller configured to determine at least one carrier phase observable from the one or more LEO satellite downlink signals, wherein determining the at least one carrier phase observable includes tracking a modified beat carrier phase of a sample of a detected LEO signal by performing an estimation operation for a time period and adaptive updating of measurement noise;

determine at least one Doppler observable from the one or more LEO satellite downlink signals, the Doppler observable characterizing a frequency shift of the detected LEO signal; and determine a position estimate of the device based on the at least one carrier phase observable and the at least one Doppler observable.

12. The device of claim 11, wherein receiving the one or more LEO satellite downlink signals includes filtering a communication band for LEO satellite downlink signals and selection of a carrier peak.

13. The device of claim 11, wherein receiving the one or more LEO satellite downlink signals includes modeling signal structure of downlink signals, processing received downlink signals in a plurality of processing intervals, and characterizing Doppler frequency of downlink signals as a linear function.

14. The device of claim 11, wherein tracking a modified beat carrier phase includes performing an adaptive Kalman filter (KF) tracking loop operation, wherein the adaptive KF tracking loop operation adaptively iterates carrier phase error of downlink signal samples using an estimate of measurement noise variance in the adaptive KF tracking loop operation to determine a carrier phase estimate of the at least one LEO satellite downlink signal.

15. The device of claim 11, wherein determining at least one Doppler observable includes performing matched subspace detection to detect a synchronization signal (SS) of the LEO satellite downlink signals, and estimating period and Doppler frequency of downlink signals using the synchronization signal.

16. The device of claim 11, wherein determining at least one Doppler observable from the one or more LEO satellite downlink signals includes detecting activity of each LEO satellite vehicle, estimating a synchronization signal (SS) and generating an initial Doppler estimation of a downlink signal based on the synchronization signal (SS).

17. The device of claim 11, wherein determining at least one Doppler observable includes characterizing a Doppler state vector for the at least one LEO satellite downlink signal to determine Doppler frequency and Doppler rate for the detected LEO signal.

18. The device of claim 11, wherein determining a position estimate includes detecting activity of a plurality of LEO satellites, wherein a matched subspace detection is performed to determine a pseudorange observable from the plurality of LEO satellites.

19. The device of claim 11, wherein determining a position estimate includes determining a pseudorange observable based on a three-dimensional position vector for the device, a three-dimension position vector of at least one LEO satellite, and measurement noise for a plurality of time intervals.

20. The device of claim 11, further comprising controlling, by the device, navigation using the position estimate, wherein a position vector is determined for the device based on a weighted nonlinear least-squares estimator solving for position estimates from a plurality of satellite vehicles.

* * * * *